Jan. 29, 1957 W. J. ALLEN 2,779,509
LUBRICATING DEVICE
Filed May 24, 1954 3 Sheets-Sheet 1
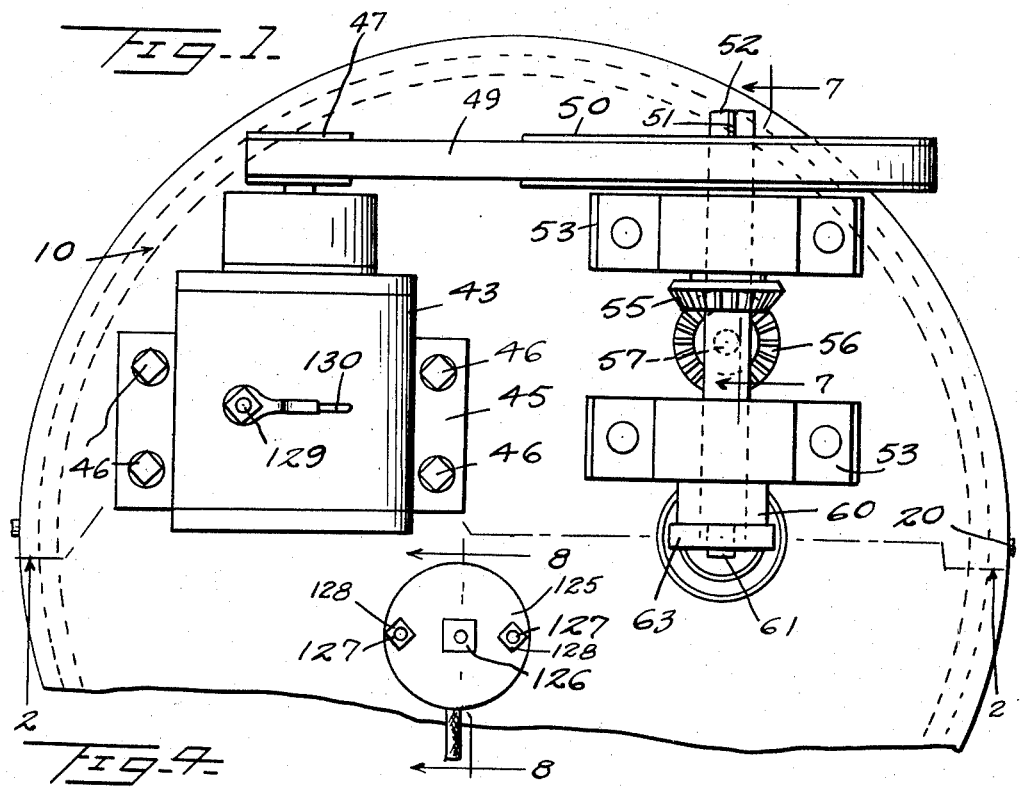
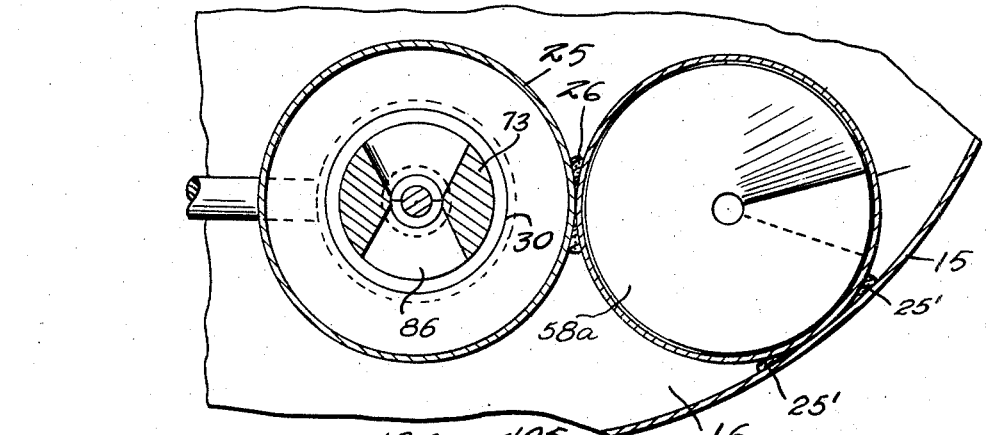
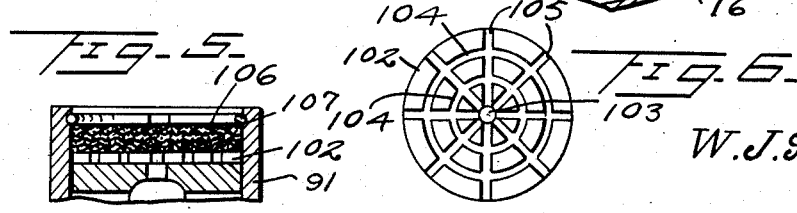
INVENTOR
W. J. Allen
BY Kimmel & Crowell
ATTORNEYS

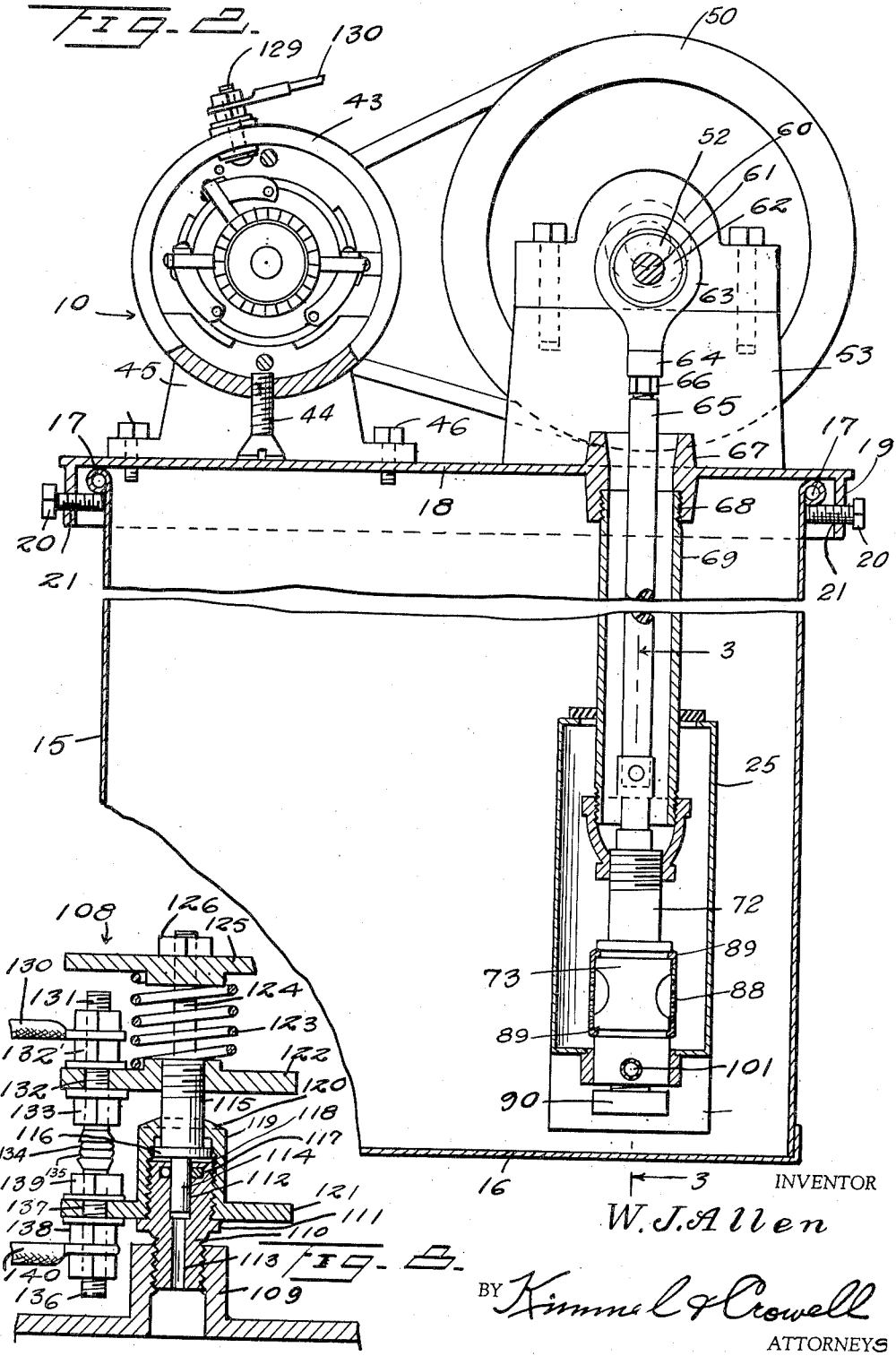

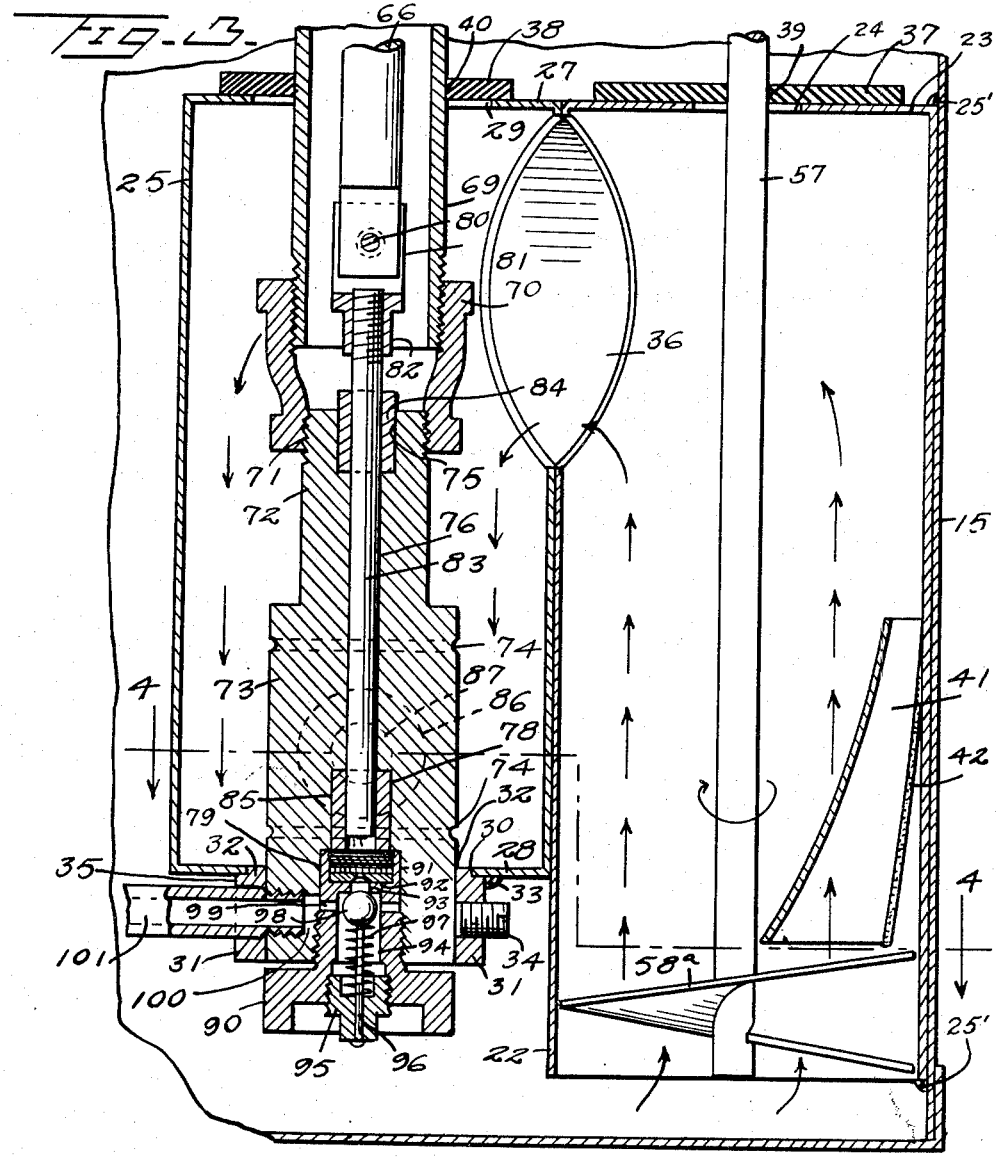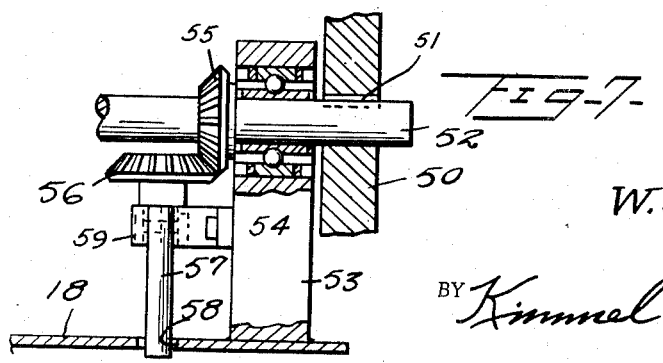

United States Patent Office 2,779,509
Patented Jan. 29, 1957

2,779,509

LUBRICATING DEVICE

Walter J. Allen, Salina, Kans.

Application May 24, 1954, Serial No. 431,908

5 Claims. (Cl. 222—189)

This invention relates to a lubricating device.

More specifically, the present invention pertains to a lubricating device or unit utilized in supplying grease, under pressure, to machinery, vehicles, and other types of equipment wherein it is necessary to reduce to a minimum the friction between two or more elements.

One of the primary objects of this invention is to provide a grease gun unit which is portable in order to service equipment disposed in numerous locations, the unit including an electrically driven pump for discharging grease therefrom.

Another object of this invention is to provide a portable grease gun unit which may be operated by electrically driven means powered from a six or twelve volt battery, the unit delivering grease at its nozzle end under extremely high pressure.

A further object of this invention is to provide screen filter means intermediate the grease pump and the discharge end thereof to prevent foreign bodies such as sand or grit from passing to the equipment being serviced, and from passing to a ball check valve in the pressure line, whereby the check valve is always free from dirt and never fails.

A still further object of this invention is to provide means for elevating grease from the bottom of a container for delivery to the input port of a high pressure grease pump.

Other and further objects and advantages of the present invention will become more apparent from a consideration of the following specification when read in the light of the annexed drawings in which:

Figure 1 is a partial top plan view of a grease pump constructed in accordance with the teachings of the instant invention.

Figure 2 is a vertical cross-sectional view taken on the horizontal plane of line 2—2 of Figure 1, looking in the direction of the arrows.

Figure 3 is an enlarged detail cross-sectional view taken on the vertical plane of line 3—3 of Figure 2, looking in the direction of the arrows.

Figure 4 is a transverse detail cross-sectional view taken on the horizontal plane of line 4—4 of Figure 3, looking in the direction of the arrows.

Figure 5 is an enlarged detail cross-sectional view of the filtering elements and assembly.

Figure 6 is a top plan view of the filter support disk.

Figure 7 is an enlarged side elevation, partly in cross-section, illustrating the driving connection for the grease agitating and elevating means.

Figure 8 is a detail cross-sectional view of a pressure release switch.

Referring now more specifically to the drawings, reference number 10 indicates, in general, a grease gun unit constructed in accordance with this invention and comprises an enlarged vertically elongated cylindrical grease container 15 having a bottom wall 16 and an open upper end having an external circumferentially rolled edge 17 adjacent thereto. The upper end of the container 15 is provided with a cover plate 18 having a circumferentially depending flange 19 spaced from and surrounding the rolled edge 17. A plurality of circumferentially spaced stud bolts 20 are threaded through circumferentially spaced openings 21 formed in the flange 19 and engage against the container 15 below the rolled edge 17 to releasably secure the cover plate 18 to the container 15.

A vertically extending elongated hollow cylindrical member 22 having a top closure wall 23 centrally apertured at 24 is secured, as by welding 25', to the inner side of the container 15. The bottom end of the member 22 is open and spaced above the bottom wall 16 to admit grease disposed within the container 15 to enter therethrough.

A second vertically elongated hollow cylindrical member 25 is secured, as by welding 26, in side-by-side relation to the outer side of the cylindrical member 22 with the longitudinal axis of the members substantially parallel. The cylindrical member 25 is provided with opposed top and bottom walls 27, 28, respectively, each of which is centrally apertured at 29 and 30.

A collar 31 having a shoulder 32 disposed within the aperture 30 is rigidly secured by welding 33 to the underside of the bottom wall 28 and is provided with a set screw 34 and a diametrically opposed opening 35, the functions of which are to be described.

Adjacent the upper ends of the members 22 and 25 an opening 36 is formed in their respective abutting sides to permit the free passage of grease from the cylinder 22 to the cylinder 25 as indicated by the arrows.

A pair of substantially heavy over-flow washers 37, 38 are supported on the top walls 23 and 27, respectively, and are apertured centrally at 39 and 40.

To serve a function to be described, the cylindrical member 22 is provided with a plurality of upwardly curved fans 41 welded thereto at 42, the lower ends of which are spaced above the lower end of the member.

An electric motor 43 is rigidly mounted by the bolt 44 to its base 45 which is releasably secured to the upper side of the cover plate 18 by a plurality of bolts 46.

The motor 43 is provided with a driving pulley 47 which is connected by an endless belt 49 with a pulley 50 keyed at 51 on one end of a shaft 52 supported for rotation on and between spaced aligned split bearing blocks 53 and journalled in bearings 54. The blocks 53 are secured to the cover plate 18 by any desirable and conventional means.

A beveled gear 55 is mounted on the shaft 52 for rotation therewith intermediate the standards 53, and meshes with a second beveled gear 56 secured to the upper end of a shaft 57 which extends downwardly through an opening 58 formed in the cover plate 18 and into the cylindrical member 22. The lower end of the shaft 57 carries a helicoidal conveyor flight 58a intermediate the lower ends of the fins 41 and the lower end of the member 22. A bracket 59 engages against the lower end of a hub 56a of the gear 56 and maintains the meshing thereof with the gear 55.

A crank member 60 carrying an offset crank arm 61 is secured to the other end of the shaft 28 and is mounted for rotation within a bearing member 62 carried at the enlarged upper end of a link 63 having a downwardly extending casing 64. A connecting rod 65 is adjustably threaded at its upper end into the casing 64 and is held in adjusted position by lock nut 66.

The connecting rod 65 extends downwardly through an enlarged, substantially hollow boss 67 which traverses the cover plate 18 and has an internally threaded portion 68 thereof depending below the cover plate 18 and into the container 15.

The upper end of an elongated tubular member 69 is threadedly connected with the lower end 68 of the boss 67 and extends downwardly through the washer aperture 40 and the aperture 29 formed in the top wall 27 and into the cylindrical member 25. A reducer coupler 70 is threadedly connected to the lower end of the member 69 to afford a threaded connection at 71 with the reduced upper end 72 of a pump cylinder block 73. A pair of axially spaced circumferential grooves 74 are formed externally of the block 73 intermediate its ends, and the lower end thereof extends through the collar 31 and is rigidly secured therein by the set screw 34.

The reduced end 72 of the block 73 is provided with an inwardly extending recess 75 communicating at its lower end with an axial passage 76 of reduced diameter which extends partially through the block 73 and opens into an enlarged passage 78 which, in turn, connects with a recess 79 having a still greater diameter and having internal threads adjacent its lower end.

The connecting rod 65 extends downwardly and loosely through the boss 67 and into the tubular member 69 for pivotal connection at 80 between the bifurcated arms 81 of a yoke element having a depending stem 82 threadedly connected with the upper end of a piston 83.

The piston 83 passes through the guide bushing 84 positioned within the recess 75 and through the passage 76 and the pump cylinder 85 disposed in the passage 78.

Intermediate the grooves 74 the cylinder block 73 is provided with two inwardly tapering openings 86, one on each side forming a feather edge against the piston, which opens into a pumping chamber 87 which communicates with the passage 76. A screen filter 88, having spring clips 89 at each end thereof seated in the grooves 74, extends across the opening 86.

The recess 79 is closed by a plug generally designated at 90. The shank of the plug is threaded adjacent the lower end thereof for engagement with the lower end of the block 73. The upper end of the plug comprises a cylindrical casing 91 having a bottom wall 92 having a central port 93 which opens into the internal bore 94, the lower end of the bore 94 is closed by a plug 95 threaded into the lower end of the plug 90, the plug 95 having an inwardly extending pin 96 projecting into the bore 94. A helicoidal spring 97 surrounds the pin 96 and abuts at its lower end against the plug 95 and at its upper end against a ball check valve 98 and constantly tends to urge the valve to seat across the port 93. The pin 96 is a stop pin for the check valve 98 to prevent hammering due to high pressure impulses.

A plurality of radially extending passages 99, disposed at right angles to each other, communicate with the upper end of the bore 94 with at least one thereof registering with an outlet port 100 formed in the block 73 and internally threaded for connection with one end of a grease conduit 101. The conduit extends through either the container 15 or its cover 18 and has a conventional nozzle (not shown) at the other end thereof.

A disk 102 having a central port 103 is provided with a plurality of concentrically and radially spaced grooves 104 and 105, respectively, and is seated on the wall 92 of the casing 91. A plurality of No. 60 mesh circular wire screen filters 106 are superimposed on the disk 102 and are held in place by a snap ring 107.

A pressure controlled motor circuit breaker, generally indicated at 108, is mounted on the cover plate 18 and comprises an enlarged hollow boss 109 registering with an opening (not shown) formed in the cover plate 18. The boss 109 comprises one portion of a T pipe fitting having its other two sides connected into the grease line 101, so that grease under excess pressure will open the switch. The boss is internally threaded to receive the threaded lower end of an elongated plug 110 having a radial flange 111 intermediate the ends thereof. A passage 112 extends inwardly from the threaded upper end of the plug 110 and communicates with the upper end of a restricted passage 113 which opens at its lower end into the boss 109. The reduced lower end 114, of a shaft 115 having an enlarged radial flange 116, is mounted for reciprocation within the passage 112 and the sealing ring 117 disposed in a groove 118 adjacent the upper end thereof.

An enlarged casing 119 having an apertured upper end wall 120 and a radial flange 121 is passed over the shaft 115 and threaded on the upper end of the plug 110 until the flange 121 engages the flange 111. An apertured disk 122 is threaded on the upper end of the shaft 115 and serves as an abutment for one end of the spring 123 which surrounds a reduced end extension 124 of the shaft 115 and passes through a second apertured disk 125 to receive the nut 126. The other end of the spring 123 abuts against the disk 125.

Guide rods 127 having lock nuts 128 extend diametrically of the flange 121 and the disks 122 and 125 to maintain their vertical disposition.

The motor 43 has one of its sides grounded and the other side thereof connects from the binding post 129 through the wire 130 to a binding post 131 locked in an aperture 132 formed in the disk 122 by the lock nuts 132', 133. The binding post 131 carries a contact point 134 normally engaging a point 135 carried on the binding post 136 locked in an aperture 137 formed in the flange 121 by nuts 138, 139. Wire 140 leads from the binding post 136 and is connected with the other side of the battery.

The motor 43 is of the type which will develop a high starting torque to overcome the high pressure head and during the first few revolutions thereof will draw heavy current from the battery. However, as the pump 10 reaches its optimum operating condition less current is demanded. Under idling conditions still less current is drawn. This motor 43 has a special coil winding tuned to the armature and field iron, which results in the highest of efficiency and uses only twelve to twenty amperes drain on a 6-volt battery.

Assuming the motor 43 is energized, the pulley 47 drives the pulley 50 through the endless belt 49. This rotates the shaft 52 and rotates the gears 55 and 56 causing the rotation of the shaft 57 and the helicoidal flight 58a to force grease in the container 15 to move upwardly along the fins 41 in the direction of the arrows in the member 22, and to pass through the opening 36 into the member 25. The grease then passes through the screen filter 88 to the inlet port 86 and into the pumping chamber 87.

The crank shaft 52 reciprocates the connecting rod 65 and its attached piston 83 whereby the piston 83 traverses the pumping chamber 87 and forces the grease therein downwardly through the screens 106 and onto the disk 102. The pumping pressure causes the grease to pass along the grooves 104 and 105 formed in the disk 102. The grease is discharged through the central port 103 and passes through the opening 93 and forces the valve 98 to move away therefrom, whereupon the grease enters the passage 99 to be discharged through the passage 100 for delivery to the inlet end of the conduit 101.

In the event the grease in either of the two cylindrical members builds up too great a volume, the pressure thereof overcomes the weight of the washers 37 and 38, and over-flows into the container 15.

Having described and illustrated one embodiment of this invention in detail, it will be understood that it is offered merely by way of example, and that the invention is to be limited only by the scope of the appended claims.

What is claimed is:

1. A pump comprising a container for the material to be pumped, said container having opposed open and closed ends, a pair of cylindrical members disposed in abutting side-by-side relationship and secured to each other and disposed within said container with the lower ends thereof positioned above said closed end, means securing one of said cylindrical members to said container, a cover for said open end of said container, means mounted on said container and extending therein and into said one cylindrical member for agitating and conveying said material upwardly therein, means communicating with said cylindrical members for passage of said material from said one member to the other of said members, pump means disposed in the other of said members and having material inlet and discharge ports, conduit means connected with said discharge port and extending through said container, and means mounted on said cover for driving said first means and said pump means.

2. A pump as defined in claim 1, said last named means comprising an electric motor.

3. A pump comprising an elongated cylindrical block having an axial bore having a radially extending inlet port communicating therewith and positioned intermediate the ends thereof and a radially extending discharge port connected therewith positioned intermediate said inlet port and one end of said block, a closure plug for said bore at said one end thereof, filter means supported by said plug intermediate said inlet and outlet ports, a piston rod mounted for reciprocation in said bore and having a pumping stroke traversing said inlet port, a disk supported by said plug adjacent the discharge side of said filter means, said disk having a plurality of grooves formed in the side thereof adjacent said filter means and a central opening therein communicating with the said grooves, said plug having a central bore extending axially thereof and communicating with the said central opening, a check valve disposed in said bore, a plurality of passages radiating from and communicating with said last named bore, and at least one of said passages communicating with the discharge port of said pump.

4. A pump as defined in claim 3, and resilient means disposed within said bore of said plug constantly tending to urge said valve to move in one direction.

5. A pump comprising an elongated cylindrical block having an axial bore having a radially extending inlet port communicating therewith and positioned intermediate the ends thereof and a radially extending discharge port connected therewith positioned intermediate said inlet port and one end of said block, a closure plug for said bore at said one end thereof, filter means supported by said plug intermediate said inlet and outlet ports, a piston mounted for reciprocation in said bore and having a pumping stroke traversing said inlet port, and a disk supported by said plug adjacent the discharge side of said filter means, said disk having a plurality of grooves formed in the side thereof adjacent said filter means, and a central opening therein communicating with said grooves.

References Cited in the file of this patent
UNITED STATES PATENTS

| | | |
|---|---|---|
| 1,919,173 | Schutt | July 18, 1933 |
| 2,187,684 | Fox | Jan. 16, 1940 |
| 2,504,683 | Harnley | Apr. 18, 1950 |
| 2,636,441 | Woelfer | Apr. 28, 1953 |